March 23, 1965 H. R. WAGNER 3,174,706
SEPARATION DEVICE

Filed Dec. 8, 1960 6 Sheets-Sheet 1

FIG. I.

Hermann R. Wagner,
INVENTOR
BY S. J. Rotondi
A. T. Dupont
W. P. Murphy

March 23, 1965 H. R. WAGNER 3,174,706
SEPARATION DEVICE
Filed Dec. 8, 1960 6 Sheets-Sheet 4

Hermann R. Wagner,
INVENTOR.

BY S. J. Rotondi
A. T. Dupont
W. P. Murphy

March 23, 1965   H. R. WAGNER   3,174,706
SEPARATION DEVICE

Filed Dec. 8, 1960   6 Sheets-Sheet 5

Hermann R. Wagner,
INVENTOR.

BY S. J. Rotondi
A. T. Dupont
W. P. Murphy

United States Patent Office 3,174,706
Patented Mar. 23, 1965

3,174,706
SEPARATION DEVICE
Hermann R. Wagner, Huntsville, Ala., assignor to the United States of America as represented by the Secretary of the Army
Filed Dec. 8, 1960, Ser. No. 74,743
8 Claims. (Cl. 244—1)
(Granted under Title 35, U.S. Code (1952), sec. 266)

The invention described herein may be manufactured and used by or for the Government for governmental purposes without the payment of any royalty thereon.

My invention relates to a separation device for retention of a pair of components in axial engagement and for release of the components responsive to a signal, and more particularly, to such a device disposed to apply a force between the components for separation thereof, responsive to the release.

Satellites travel in orbits around primary bodies in space due to attraction between the primary bodies and the satellites. Artificial satellites are put in orbits by transportation to points in the respective orbits and application to the satellites of velocities corresponding to the points. The masses of the satellites may be disposed in oblate distribution for spin stabilization of the satellites to orient the spin axes thereof in the orbit.

Apparatus including assemblies of artificial satellites and vehicles disposed in tandem relation therewith are launched from the earth for the transportation and for application to the satellites of the predetermined orbital velocities. The vehicles are usually cylindrically disposed to include propulsion mechanisms for the transportation and application to the satellites of forces to provide the orbital velocities, and the vehicles are separated from the satellites at the orbit points to restore the oblate configuration.

An object of my invention therefore is to provide such a device disposed to secure a pair of components in axial engagement and release one of the components responsive to an electric signal.

Another object of my invention is to provide such a device disposed to apply a force between the components for separation thereof responsive to the release.

An additonal object of my invention is to provide such a device disposed to apply a value of the separation force between a vehicle and a satellite for independent orbital progress thereof.

Other aims and objects of my invention will appear from the following description.

In carrying out my invention, apparatus including a satellite and a vehicle therefor, secured together in axial engagement by a separation device, are disposed for conveyance of the satellite to a point in space and for application to the satellite of forces for orbit of the satellite about a major space body. The apparatus is disposed to provide an electric signal at the space point for release of the satellite thereat responsive to the signal.

The device includes a member secured to the vehicle and provided with radial cylinders, and an axial chamber in communication therewith. The satellite and vehicle include flanges disposed for the axial engagement, and the device includes rods with pistons in the cylinders. The rods are slidably disposed and provided with positions for simultaneous engagement with the flanges to secure the satellite and vehicle in the axial relation.

Squibs are disposed in the chamber for combustion to generate gas pressure responsive to the signal, and a spindle slidable in the chamber is provided with a closed position to block the cylinders. Shoulders are provided on the rods, and a cap is secured to the spindle for closed position engagement with the shoulders to secure the rods in the simultaneous engagement positions.

A diaphragm is secured in the chamber to seal a portion thereof against loss of gas in the vacuum of space, and the diaphragm is disposed for rupture responsive to a predetermined pressure of the gas.

A pin secured in the chamber to engage the spindle is disposed for shear responsive to a second predetermined pressure of the gas for slidable operation of the spindle to uncover the cylinders. The rods move outwardly to release the satellite responsive to the gas pressure.

An actuator is secured in axial slidable relation with the member and a spring is disposed therebetween to bias the actuator into engagement with the satellite and to provide a force for separation of the vehicle from the satellite responsive to the release.

For more complete understanding, reference is directed to the following description and the accompanying drawings, in which.

Figure 1:
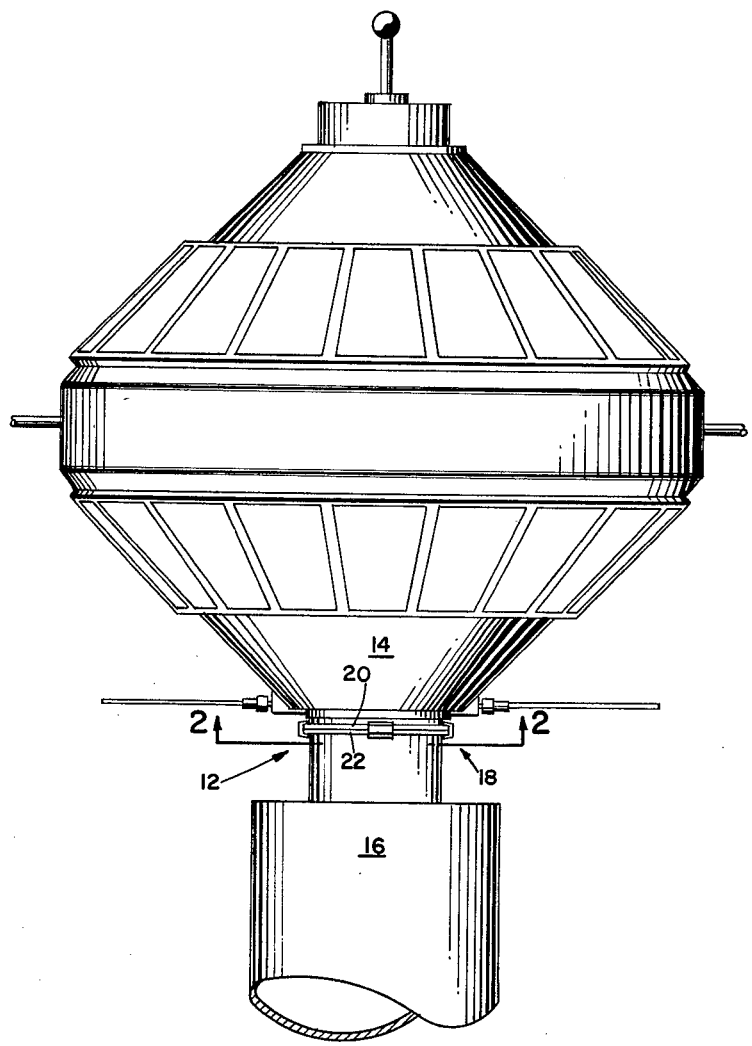
FIGURE 1 is an elevation of apparatus including a satellite and a vehicle therefor secured together by a separation device.
Figure 2:
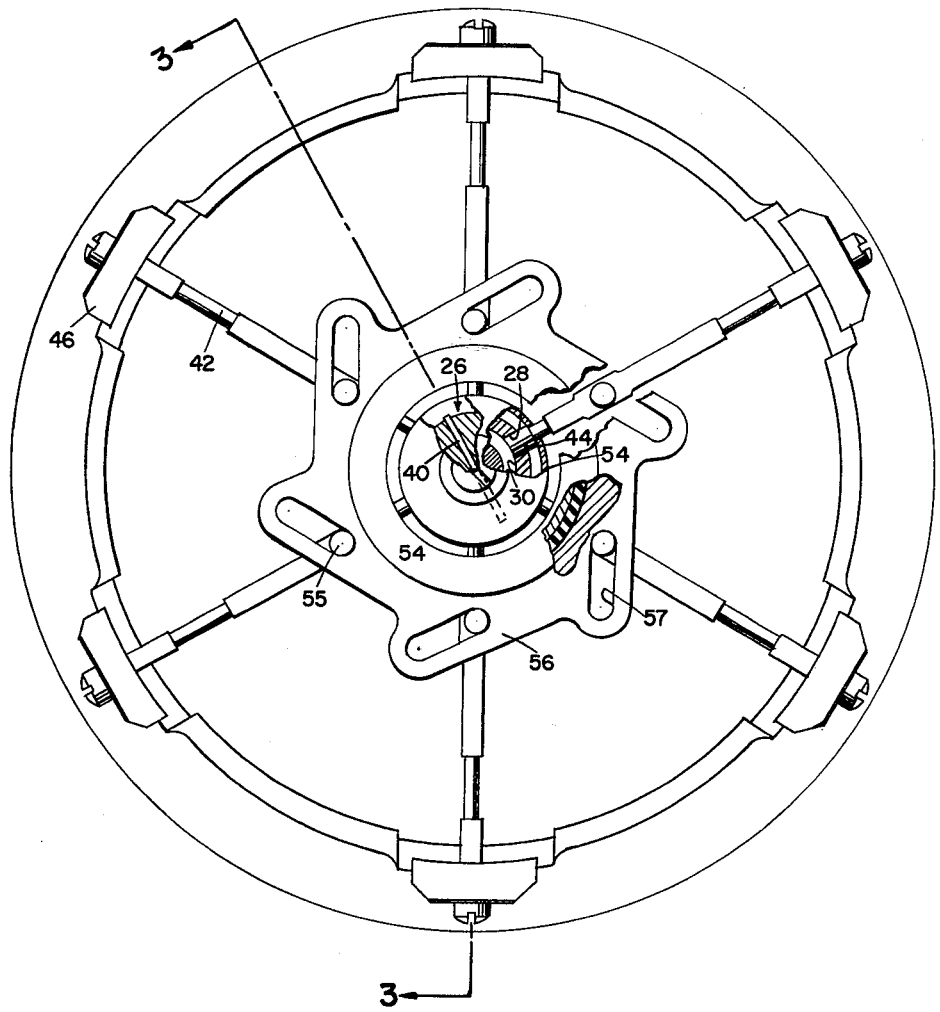
FIGURE 2 is a partly cut away view along line 2—2 of FIGURE 1 with rods 42 in the positions of simultaneous engagement.

Accordingly an apparatus 12 includes components such as a satellite 14 and a vehicle 16 therefor which may be a missile. The apparatus is provided with a separation device 18 for retention of the components in alignment with alignment with respect to axis 19 for travel of the apparatus to to a point in space. The device is disposed for release of the components at the space point and for separation of the components responsive to the release.

Satellite 14 and vehicle 16 are provided with respective flanges 20 and 22 disposed for engagement in the axial alignment and a source of electrical energy (not shown), to provide a signal at the space point.

Device 18 is provided with a retention mechanism 24 including a member 26 secured to vehicle 16 and provided with pairs of transverse cylinders 28 in radial relation and an axial chamber 30 in communication with the cylinders. A source of gas pressure such as squibs 32 is secured in chamber 30 and connected to the electrical source by wires 34 for combustion of the squibs and generation of gas responsive to the signal. A diaphragm 36 is secured in chamber 30 for gas tight enclosure of squibs 32 to prevent leakage of combustion gases in space.

Figure 3:
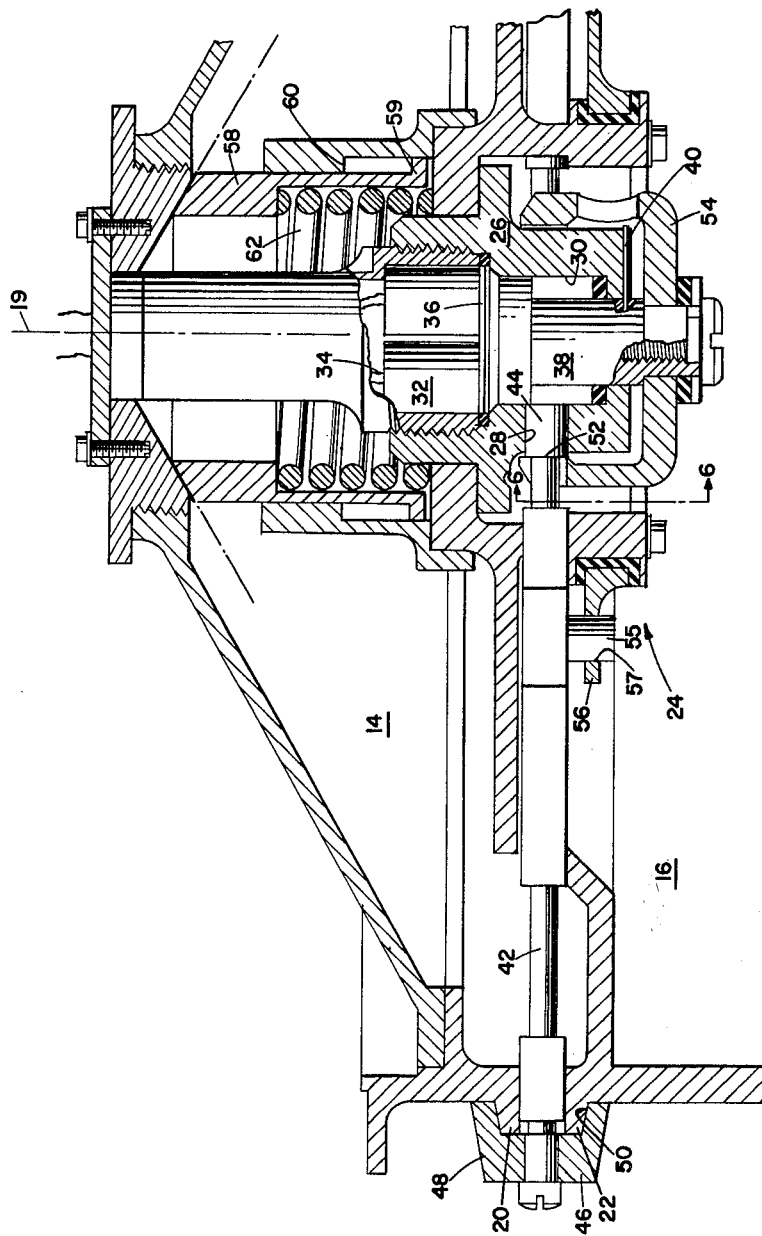
FIGURE 3 is a view along line 3—3 of FIGURE 2, partly in section, with a spindle 38 in closed position.
Figure 4:
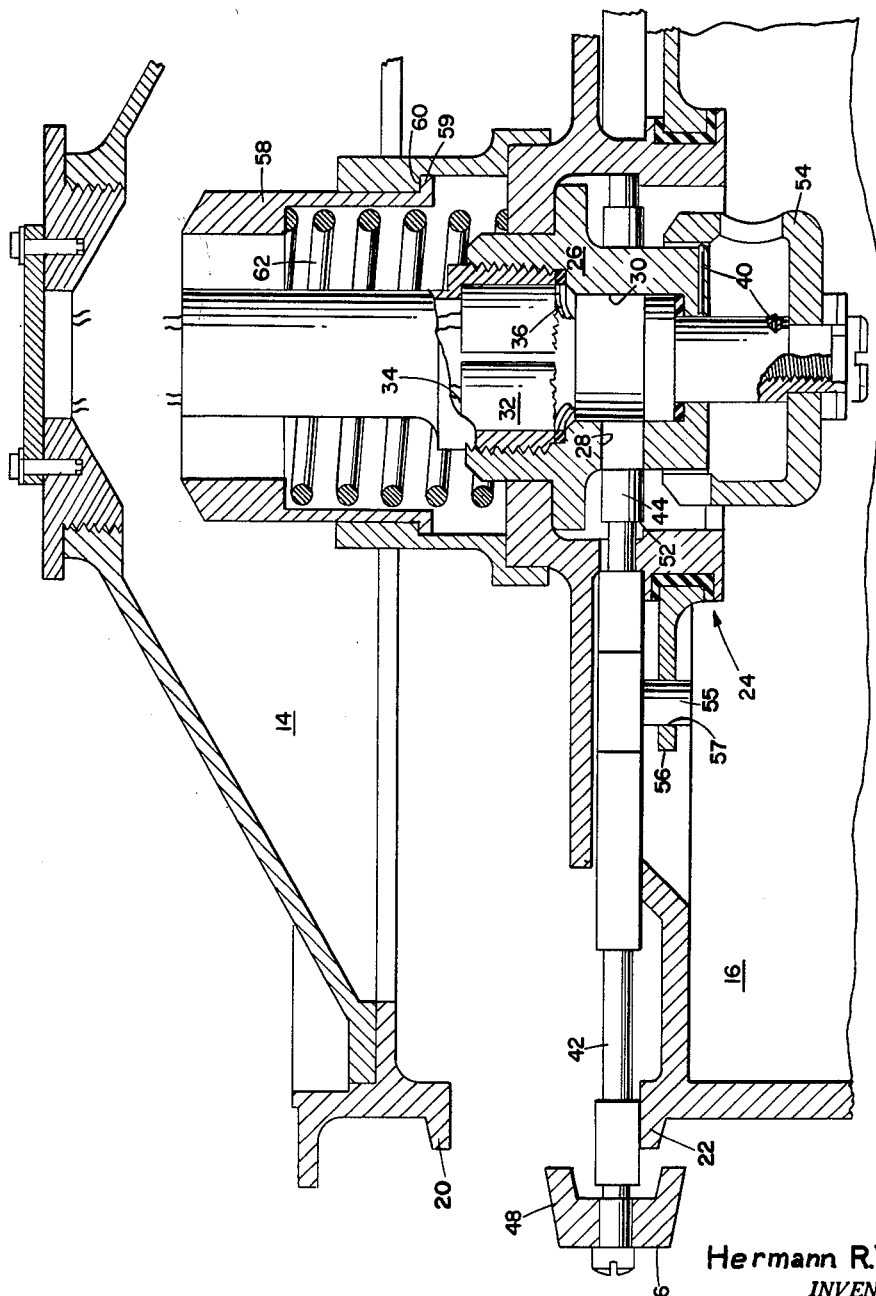
FIGURE 4 is a view similar to FIGURE 3 with spindle 38 displaced from the closed position.
Figure 5:
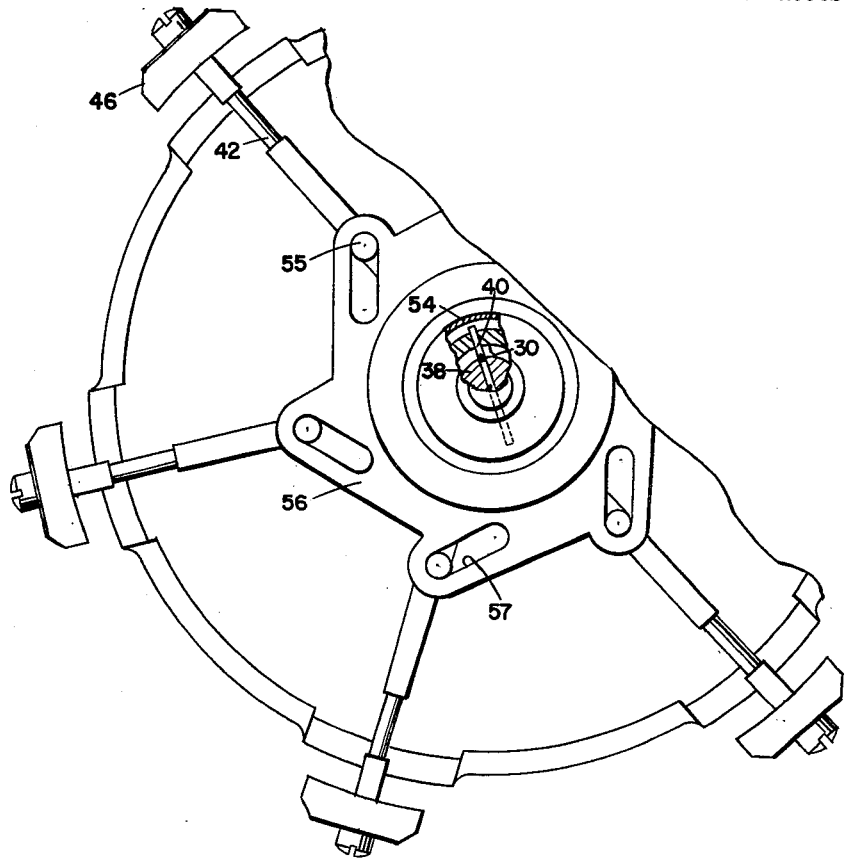
FIGURE 5 is a view similar to FIGURE 2 with rods 42 displaced from the simultaneous engagement positions.
Figure 6:
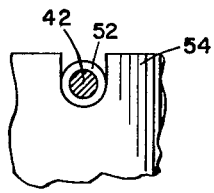
FIGURE 6 is a view along 6—6 of FIGURE 3.
Figure 7:
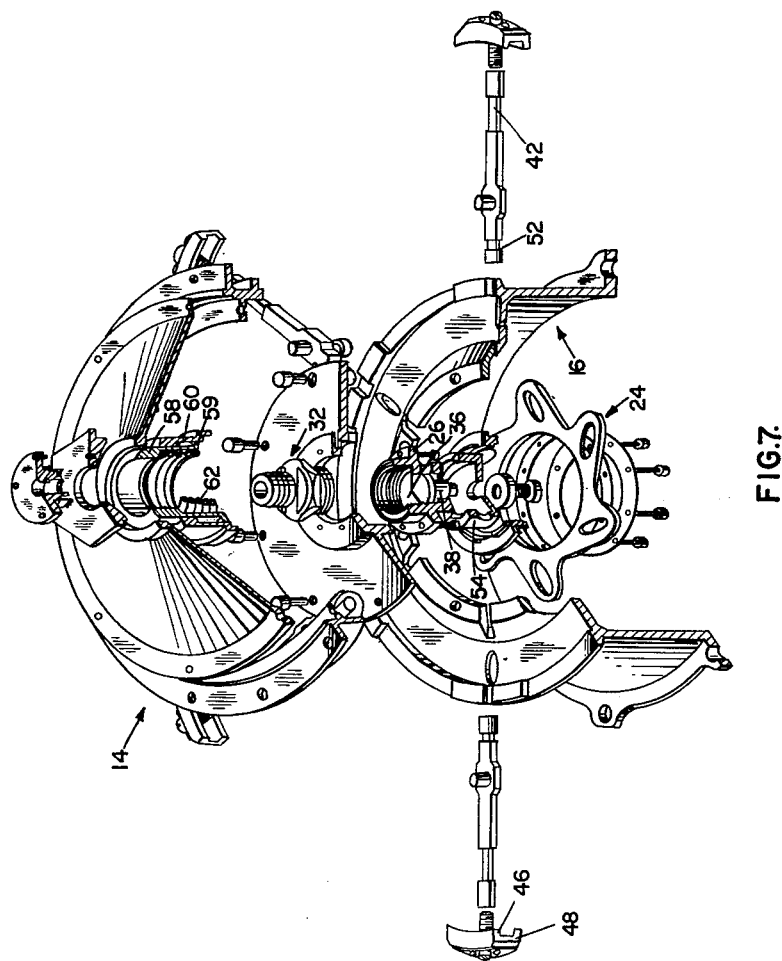
FIGURE 7 is an exploded view of the apparatus.

A spindle 38 slidably disposed in chamber 30 is provided with a closed position as in FIGURE 3, to block access of gas to cylinders 28, and a pin 40 is secured to member 26 to secure spindle 38 in the closed position.

Rods 42 respectively include pistons 44 slidably disposed in corresponding cylinders 28 and the rods are respectively provided with clamps 46 each including a pair of projections 48 with respective surfaces 50 for simultaneous engagement with flanges 20 and 22 in the closed position to secure the vehicle to the satellite.

The rods respectively include shoulders 52 and a cap 54 is secured to spindle 38 and disposed for closed position engagement with shoulders 52 to secure clamps 46 in the simultaneous engagement. The rods are respectively provided with followers 55, and a cam 56 rotatably disposed on vehicle 16 is provided with slots 57 disposed for respective engagement with followers 55 to provide simultaneous slidable operation of rods 42.

An actuator 58 is disposed for axial slidable relation with member 26, and the actuator and member are provided with respective flanges 59 and 60 disposed for engagement to limit the slidable relation. A spring 62 engages member 26 to bias actuator 58 to engagement with satellite 14 in the axial engagement.

*Operation*

The assembly is conveyed to a point in the satellite orbit for separation of the satellite from the vehicle and the satellite is provided with the velocity required at the particular point for the satellite to proceed in the orbit by operation of the vehicle. The squibs are ignited at the separation point by the signal and diaphragm 36 is disposed to burst responsive to a predetermined pressure of the gas. Pin 40 is disposed to shear, responsive to a higher predetermined pressure of the gas, for movement of spindle 38 and simultaneous disengagement of cap 54 from shoulders 52 to uncover cylinders 28 and permit engagement of the gas with pistons 44. Rods 42 are moved outwardly responsive to the gas pressure for disengagement of clamps 46 from the flanges and release of vehicle 16 from satellite 14. Surfaces 50 of the projections converge outwardly from axis 19 to facilitate the release. Cam 56 constrains rods 42 to provide uniform operation thereof and equalize transverse forces on satellite 14.

Spring 62 is disposed to provide an axial separation force between satellite 14 and vehicle 16 responsive to the release to provide displacement of the vehicle from the satellite for independent operation thereof in orbit.

While the foregoing is a description of the preferred embodiment the following claims are intended to include those modifications and variations that are within the spirit and scope of my invention.

I claim:

1. Apparatus for travel to a point in a space orbit about a major body comprising: a pair of components including an artificial satellite and a vehicle disposed for transportation of said satellite to the point; and a unitary separation device; said components disposed to provide an electric signal at the point, said separation device including first means for securing said components in axial engagement and second means disposed between said engaged components for continually exerting a separation force therebetween, said first means releasing said components responsive to said signal and said second means simultaneously effecting separation of said components from engagement, and said apparatus disposed to impart to said satellite the velocity required at the point for independent orbital progress of said satellite.

2. Apparatus as in claim 1 with said separation device provided with a source for generation of pressure responsive to the signal; and rods radially secured in said vehicle and provided with a position for simultaneous engagement with said satellite and vehicle for retention thereof in the axial engagement; said rods being slidably disposed for release of said satellite responsive to the generation.

3. Apparatus as in claim 2 with said rods respectively provided with shoulders; and said separation device comprising a member secured to said vehicle and provided with cylinders corresponding to said rods and an axial chamber communicating with said cylinders; piston respectively secured to said rods and disposed in said cylinders; a spindle disposed in said chamber and provided with a closed position blocking said cylinders; and a cap secured to said spindle and disposed for closed position engagement with said shoulders to secure said rods in the simultaneous engagement; said pressure source comprising squibs secured in said chamber and disposed to generate gas for the pressure responsive to the signal; said spindle being disposed for slidable operation to unblock said cylinders and release said shoulders; and said rods being slidably disposed to release said satellite responsive to the gas pressure.

4. Apparatus as in claim 2 with a diaphragm secured in said chamber adjacent said squibs to provide a vacuum tight enclosure thereof for the generation, and disposed for rupture responsive to a first predetermined value of the gas pressure.

5. Apparatus as in claim 3 with a pin secured in said member for engagement with said spindle in the closed position; said pin being disposed to shear for the slidable operation responsive to a second predetermined value of the gas pressure.

6. Apparatus as in claim 2 with said satellite and vehicle respectively provided with flanges for the axial engagement; and said rods respectively including clamps with projections disposed for respective engagement with the flanges in the simultaneous engagement; said flanges and projections being correspondingly beveled to facilitate the release.

7. Apparatus as in claim 3 with said rods respectively provided with followers; and a cam rotatably disposed on said member and provided with slots for respective engagement with said followers for simultaneous radial operation of said rods.

8. Apparatus as in claim 3 with an actuator disposed for axial slidable relation with said member; and a spring disposed between said member and actuator for bias thereof to engage said satellite in the axial engagement; said actuator and member being provided with flanges disposed for engagement to limit the slidable relation; and said spring being disposed to apply a force for the relative displacement responsive to the release.

References Cited by the Examiner

UNITED STATES PATENTS

| | | | |
|---|---|---|---|
| 654,044 | 7/00 | Alexander | 220—55 |
| 2,809,584 | 10/57 | Smith | 102—49 |
| 2,959,129 | 11/60 | Warren | 102—49 |
| 2,977,080 | 3/61 | Von Zborowski | 244—140 |
| 3,001,739 | 9/61 | Faget et al. | 224—1 |

FERGUS S. MIDDLETON, *Primary Examiner.*

EMILE PAUL, *Examiner.*